(12) United States Patent
O'Donnell

(10) Patent No.: US 10,745,293 B2
(45) Date of Patent: Aug. 18, 2020

(54) SYSTEMS AND METHODS OF PROVIDING MICRO-RENEWABLE ELECTRICAL ENERGY

(71) Applicant: Paul O'Donnell, Kennesaw, GA (US)

(72) Inventor: Paul O'Donnell, Kennesaw, GA (US)

(*) Notice: Subject to any disclaimer, the term of this patent is extended or adjusted under 35 U.S.C. 154(b) by 322 days.

(21) Appl. No.: 15/888,159

(22) Filed: Feb. 5, 2018

(65) Prior Publication Data

US 2018/0155211 A1 Jun. 7, 2018

Related U.S. Application Data

(62) Division of application No. 14/527,428, filed on Oct. 29, 2014, now Pat. No. 9,884,773.

(Continued)

(51) Int. Cl.
*F24C 15/32* (2006.01)
*C02F 1/14* (2006.01)
(Continued)

(52) U.S. Cl.
CPC .............. *C02F 1/14* (2013.01); *C02F 1/32* (2013.01); *F24B 5/00* (2013.01); *H02J 7/35* (2013.01); *C02F 2201/009* (2013.01); *C02F 2201/3222* (2013.01); *C02F 2303/10* (2013.01); *Y02A 20/211* (2018.01); *Y02A 20/212* (2018.01); *Y02B 10/14* (2013.01); *Y10T 307/328* (2015.04)

(58) Field of Classification Search
CPC .... A47J 37/0754; A47J 33/00; A47J 37/0763; A47J 37/0704; A47J 37/07; A47J 31/005; A47J 31/0615; A47J 31/0626; A47J 37/079; A47J 36/26; F24C 15/322; A01H 4/006
See application file for complete search history.

(56) References Cited

U.S. PATENT DOCUMENTS

| 520,173 A | 5/1894 | Wagner |
|---|---|---|
| 2,419,319 A | 4/1947 | Fletcher |

(Continued)

FOREIGN PATENT DOCUMENTS

| DE | 3405466 A1 | 8/1985 |
|---|---|---|
| DE | 10000874 A1 | 7/2001 |

(Continued)

OTHER PUBLICATIONS

International Preliminary Report on Patentability for PCT/US15/32983 dated Dec. 8, 2016.

(Continued)

*Primary Examiner* — Jason Lau
(74) *Attorney, Agent, or Firm* — Meunier Carlin & Curfman LLC

(57) ABSTRACT

Various implementations of a system that addresses the need for clean drinking water, improved solid fuel combustion and convection of the heat resulting from the combustion, exhausting of gases and air-borne particulates resulting from combustion, and provides electricity for lighting and charging of battery-operated devices are described herein. The system may include at least one solar panel, a battery, a fan assisted exhaust hood, a fan assisted cooking device, and a water purification device. Such a device could not only save millions of lives, but the quality of life for millions of people living in impoverished areas or refugee camps could be improved dramatically.

15 Claims, 8 Drawing Sheets

Related U.S. Application Data

(60) Provisional application No. 62/004,694, filed on May 29, 2014.

(51) Int. Cl.
*C02F 1/32* (2006.01)
*H02J 7/35* (2006.01)
*F24B 5/00* (2006.01)

(56) References Cited

U.S. PATENT DOCUMENTS

| | | | |
|---|---|---|---|
| 3,279,452 | A | 10/1966 | Hottenroth et al. |
| 3,347,220 | A | 10/1967 | Barbera, Sr. et al. |
| 3,647,323 | A | 3/1972 | Thomas |
| 3,697,198 | A | 10/1972 | Holder |
| 3,868,943 | A | 3/1975 | Hottenroth |
| 3,939,817 | A | 2/1976 | Nuss et al. |
| 3,982,522 | A | 9/1976 | Hottenroth et al. |
| 4,426,995 | A | 1/1984 | Wilson |
| 4,867,993 | A | 9/1989 | Nordskog et al. |
| 5,168,860 | A | 12/1992 | Kibourian et al. |
| 5,195,504 | A | 3/1993 | Lane |
| 5,445,137 | A | 8/1995 | Crews et al. |
| 5,536,206 | A | 7/1996 | Bodmer et al. |
| 6,067,979 | A | 5/2000 | Jaasma et al. |
| 6,393,775 | B1 | 5/2002 | Staschik |
| 6,436,283 | B1 | 8/2002 | Duke et al. |
| 6,520,173 | B2 | 2/2003 | Lautner et al. |
| 6,808,545 | B1 | 10/2004 | Shuler et al. |
| 6,820,375 | B2 | 11/2004 | Meeker et al. |
| 6,870,089 | B1 | 3/2005 | Gray |
| 7,134,285 | B2 | 11/2006 | Primlani et al. |
| 7,150,153 | B2 | 12/2006 | Browe |
| 7,339,286 | B1 | 3/2008 | Chen et al. |
| 7,565,968 | B2 | 7/2009 | Lindley et al. |
| 7,888,590 | B2 | 2/2011 | Niederer |
| 8,006,686 | B2 | 8/2011 | Hunt et al. |
| 8,212,142 | B2 | 7/2012 | Lyman et al. |
| 8,297,271 | B2 | 10/2012 | Cedar et al. |
| 8,596,258 | B1 | 12/2013 | Gonzalez et al. |
| 2004/0108280 | A1 | 6/2004 | Saraceno et al. |
| 2006/0260672 | A1 | 11/2006 | Niederer et al. |
| 2008/0034492 | A1 | 2/2008 | Essig et al. |
| 2009/0025703 | A1 | 1/2009 | Van Der Sluis et al. |
| 2009/0165769 | A1 | 7/2009 | Van Der Sluis |
| 2010/0236594 | A1 | 9/2010 | Hammann et al. |
| 2011/0017200 | A1 | 1/2011 | Zwern et al. |
| 2011/0017679 | A1 | 1/2011 | Zwern et al. |
| 2011/0021134 | A1 | 1/2011 | Zwern et al. |
| 2011/0099918 | A1 | 5/2011 | Buchmann |
| 2012/0152318 | A1 | 6/2012 | Kee |
| 2012/0293982 | A1 | 11/2012 | Labans et al. |
| 2013/0106191 | A1* | 5/2013 | Iovino ............... H02J 7/02 307/72 |
| 2013/0112187 | A1 | 5/2013 | Cedar et al. |
| 2013/0183562 | A1 | 7/2013 | Workman et al. |
| 2013/0199516 | A1 | 8/2013 | Snyder et al. |
| 2013/0313176 | A1 | 11/2013 | Schumm et al. |

FOREIGN PATENT DOCUMENTS

| | | |
|---|---|---|
| GB | 2125160 A | 2/1984 |
| KR | 100655421 B1 | 12/2006 |
| WO | 03031341 A1 | 4/2003 |
| WO | 2011011011 A1 | 1/2011 |
| WO | 2011099042 A2 | 8/2011 |
| WO | 2013093654 A2 | 6/2013 |

OTHER PUBLICATIONS

International Search Report and Written Opinion for PCT/US15/32983 dated Nov. 24, 2015.
Non-Final Office Action issued in U.S. Appl. No. 15/888,160, dated Mar. 23, 2020, 8 pages.

* cited by examiner

SYSTEMS AND METHODS OF PROVIDING MICRO-RENEWABLE ELECTRICAL ENERGY

CROSS REFERENCE TO RELATED APPLICATIONS

This non-provisional patent application is a divisional of U.S. patent application Ser. No. 14/527,428, entitled "Systems and Methods of Providing Micro-Renewable Electrical Energy" and filed Oct. 29, 2014, which claims priority to U.S. Provisional Patent Application No. 62/004,694, entitled "Systems and Methods of Providing Micro-Renewable Electrical Energy" and filed May 29, 2014, the contents of which are herein incorporated by reference in their entirety.

BACKGROUND

Electricity is rapidly becoming a "basic human need". Though the power grid is expanding across the globe, 1.4 billion people (20% of the population) still do not have access to electricity. These people tend to be the poorest and live in remote locations. The costs associated with bringing grid power to many of these people are astronomical, and the timeline is in multiple decades. Additionally the cost and return on investment (ROI) for the currently available, off-grid solutions is so poor that it makes these projects non-starters.

In addition, every day, 3.6 billion people cook with solid fuels (e.g., wood, coal, or dung, for example). Many of these people cook indoors with little or no ventilation. This results in 3.5 million deaths due to respiratory illness every year. Dozens of "Improved Cookstove" programs exist, but none have had any widespread success.

Furthermore, 700 million people do not have access to safe drinking water. This results in 3.4 million deaths from waterborne illness every year. There are a myriad of initiatives across the globe to improve the safety of drinking water. However, the majority of them involves large, expensive projects on a community scale and do not address the needs of the most remote and poorest people.

Thus, there is a need in the art for a device that could cost-effectively address all three of these issues without requiring connection to an established electrical grid.

BRIEF SUMMARY

According to various implementations, a system that addresses all three of the above issues includes at least one solar panel, a battery, a fan assisted exhaust hood, a fan assisted cooking device, and a water purification device. Such a system could not only save millions of lives, but the quality of life for millions of people living in impoverished areas or refugee camps could be improved dramatically.

In various implementations, the system includes one or more solar panels, a battery for storing electrical energy converted from solar energy collected by the one or more solar panels, a forced draft interior ventilation device, a variable speed, fan-assisted cooking device for improving combustion of solid fuel, and an ultra-violet (UV) light water purification device. In further implementations, the system may also include one or more outlets for charging cellular phones or powering light emitting diode (LED) lights, a water tank, and a collapsible and expandable funnel that facilitates capturing rainwater into the water tank. In certain implementations, the solar panel, fan-assisted exhaust hood device, fan-assisted cooking device, and the water purification device are configured for being disassembled and disposed within the water tank for transportation of the system. And, in some implementations, one or more of these system components may be provided separately or in combination with one or more of the other system components listed above.

Thus, by providing multiple benefits in one system, the costs associated with solving each individual problem are reduced. In addition, this system may be integrated more easily in existing households, making it a more viable solution. This system may also be helpful in disaster recovery or refugee situations in which large populations of displaced people face disruption of basic services and similar health threats.

The fan assisted cooking device according to various implementations includes a conduit having a distal end and a proximal end, a perforated housing in fluid communication with the distal end of the conduit, and an electrically powered fan in fluid communication with the conduit. The fan forces air through the conduit toward the distal end and out through the perforated holes defined in the housing. The housing is made of a melt-resistant material, such as a ceramic or metallic material, and is disposed within at least a portion of the solid fuel mass being combusted. The air flowing through the perforated holes defined in the housing assists with combustion of the solid fuel and convection of the heat resulting from the combustion.

Furthermore, according to certain implementations, a flexible photovoltaic material is disposed on at least a portion of a surface of the collapsible and expandable funnel, such as an inner surface. The photovoltaic material is configured for collecting solar energy and water incident on the material. Thus, the funnel serves to collect solar energy that may be converted into electrical or thermal energy on days providing sufficient amounts of sunlight and to collect rain water on rainy days.

BRIEF DESCRIPTION OF THE DRAWINGS

The components in the drawings are not necessarily to scale relative to each other. Like reference numerals designate corresponding parts throughout the several views.

DETAILED DESCRIPTION

Various implementations of a system that addresses the need for clean drinking water, improved solid fuel combustion and convection of the heat resulting from the combustion, exhausting of gases and air-borne particulates resulting from combustion, and provides electricity for lighting and charging of battery-operated devices are described herein. The system may include at least one solar panel, a battery, a fan assisted exhaust hood, a fan assisted cooking device, and a water purification device. Such a device could not only save millions of lives, but the quality of life for millions of people living in impoverished areas or refugee camps could be improved dramatically.

Figure 1:
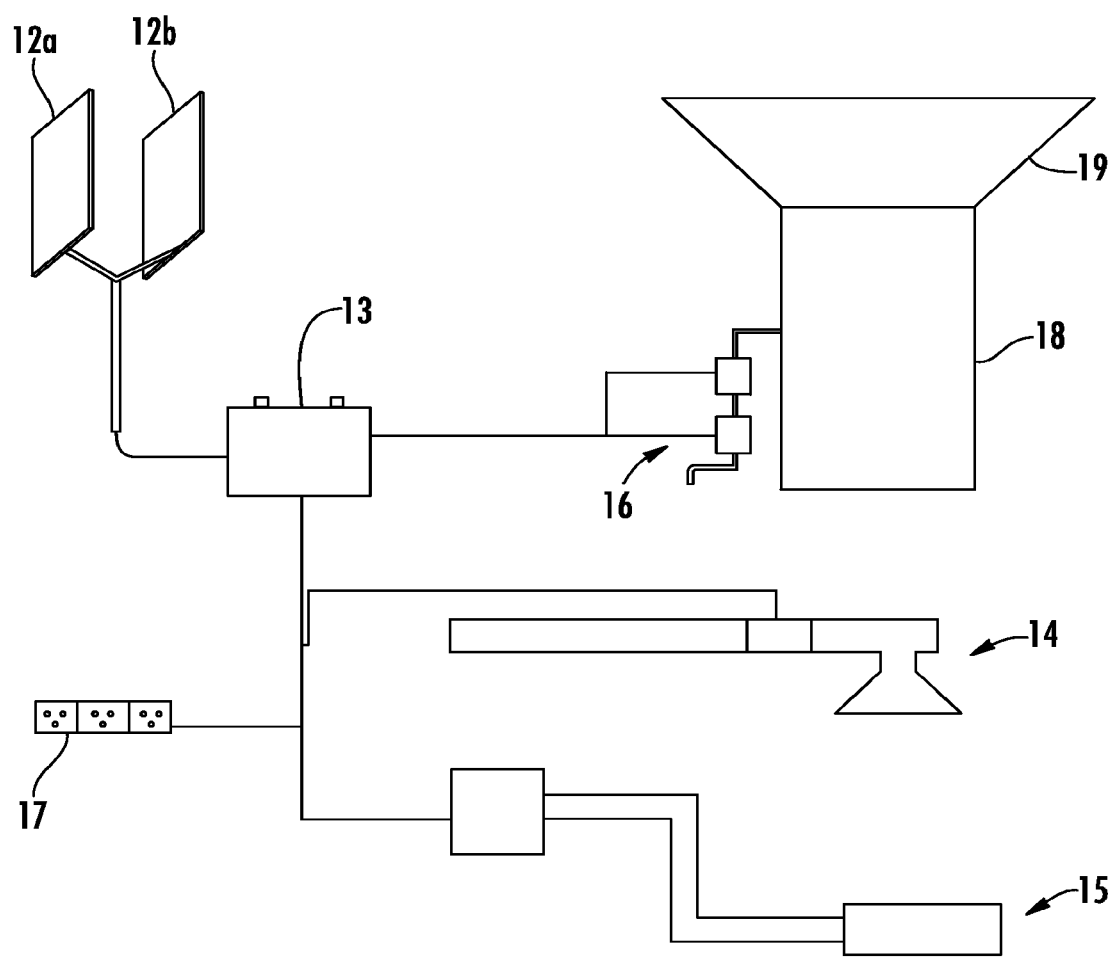
FIG. 1 illustrates a schematic of a system according to one implementation.

FIG. 1 illustrates a schematic of an exemplary implementation of the system. The system 10 includes two solar panels 12a, 12b, a battery 13 for storing electrical energy converted from solar energy collected by the solar panels 12a, 12b, a forced draft interior ventilation device 14, a variable speed, fan-assisted cooking device 15 for improving combustion of solid fuel and convection of the heat resulting from the combustion, and a water purification device 16. In addition, the system 10 includes an outlet strip 17 for charging battery operated devices (e.g., cellular phones) or powering light emitting diode (LED) lights, for example, a water tank 18, and a collapsible funnel 19 that facilitates capturing rainwater into the water tank 18.

According to various implementations, the solar panels 12a, 12b may provide about 1 to 1600 watts of power. For example, in certain implementations, the solar panels 12a, 12b are about 80 to about 200 watt solar panels and may be monocrystalline or polycrystalline. For example, a Grape Solar 105-Watt monocrystalline PV solar panel (e.g., http://www.homedepot.com/p/Grape-Solar-105-Watt-Monocrystalline-PV-Solar-Panel-for-RV-s-Boats-and-12-Volt-Systems-GS-S-105-Fab8/202960004) or a Grape Solar GS STAR 100 W polycrystalline solar panel may be used (e.g., http://www.amazon.com/Grape-Solar-GS-STAR-100W-Polycrystalline-100-watt/dp/B00CAVMMMG/ref=sr 1 4?ie=UTF8&gid=1401367207&sr=8-4&keywords=100+watt+solar+panel). Furthermore, the solar panels 12a, 12b may be modular, and the amount of power may be increased or decreased by adding or removing panels from the support structure. For example, three solar panels providing 200 watts each may be included on the support structure to provide about 600 watts total, according to one implementation.

Solar energy captured by the solar panels 12a, 12b is converted to electrical energy and is stored in the battery 13 for immediate or future use to power interior lighting, the charging of battery operated devices, the fans for the ventilation device 14 and/or the cooking device 15, and/or the water purification device 16.

The battery 13 may be a 12 VDC lead-acid, deep cycle, typical car sized battery (24-29M), rated for between 60-100 amp hours to be mounted on or adjacent to the solar panel mounts. For example, the battery may include a DieHard or similar brand battery such as the battery shown in http://www.sears.com/diehard-marine-deep-cycle-rv-battery-group-size-24m/p-02827494000P?prdNo=4&blockNo=4&blockType=G4. For example, in one such implementation, the system may also include a charge controller (not shown) between the solar panels 12a, 12b and the battery 13. Other types of batteries having a different voltage may be used in other implementations.

Figure 5:
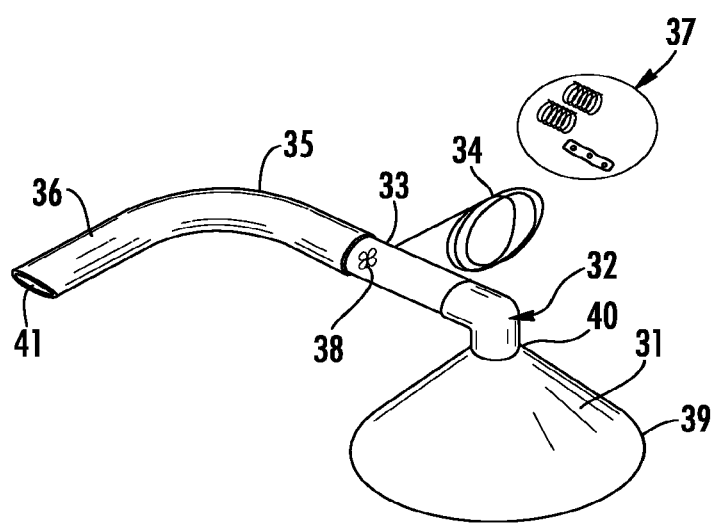
FIG. 5 illustrates a perspective view of the exhaust hood shown in FIG. 1.

The forced draft interior ventilation device 14 is mounted above a cooking area to assist with removing gases and air-borne particulates that result from solid fuel combustion. In the implementation shown in FIG. 5, the device 14 includes a collapsible, frusto-conical shaped hood 31, an elbow-shaped conduit 32, a fan conduit 33 having an internally mounted, electrically powered fan 38, a power cord 34 for supplying power to the fan 38, flexible conduit 35, and mounting hardware 37 for mounting the conduits 33, 35 above the cooking area. The hood 31 has an inlet end 39 and an outlet end 40. The inlet end 39 has a larger diameter than the outlet end 40 and is disposed closer to the cooking area. For example, the inlet end 39 may have a diameter of about 24-40 inches, and the outlet end 40 may have an outer diameter of about 4-10 inches. The outlet end 40 is connected with one end of the elbow-shaped conduit 32, which may have an inner diameter of about 6 inches to securely receive the outlet end 40. Connected to the other end of the elbow-shaped conduit 32 is the fan conduit 33 with the internally mounted fan 38. The power cord 34 is connected to the fan 38 to supply power to the fan 38. The other end of the conduit is connected to a proximal end of the flexible conduit 35. The flexible conduit 35 may be bent to extend toward an external wall of the dwelling, for example. A distal end of the flexible conduit 35 includes wall penetration conduit portion 36. At least a portion of the wall penetration conduit portion 36 is disposed outside the dwelling to allow the exhaust captured by the hood 31 to be exhausted to outside of the dwelling. The wall penetration conduit portion 36 may be separately formed and attached to the distal end of the flexible conduit 35 or it may be integrally formed with the flexible conduit 35. In the implementation shown, the conduits 32, 33, 35, hood 31, and wall penetration conduit portion 36 may be made of aluminum, galvanized steel, or other suitable material. The fan 38 may be a 12 VDC fan that is internally mounted within the conduit 33. The components of the device 14 may include any components suitable for heating, ventilation, and air conditioning use and may include, for example, the Master Flow 6 inch, 90 degree round adjustable elbow and the Master Flow 6 inch diameter, 96 inch long, aluminum flex pipe (see e.g., http://www.homedepot.com/p/Master-Flow-6-in-90-Degree-Round-Adjustable-Elbow-B90E6/100062966 and http://www.homedepot.com/p/Master-Flow-6-in-x-96-in-Aluminum-Flex-Pipe-AF6×96/203612840).

In another implementation (not shown), the fan may be disposed external to the conduit 33, such as in a separate housing, but be in fluid communication with the hood 31.

Figure 2C:
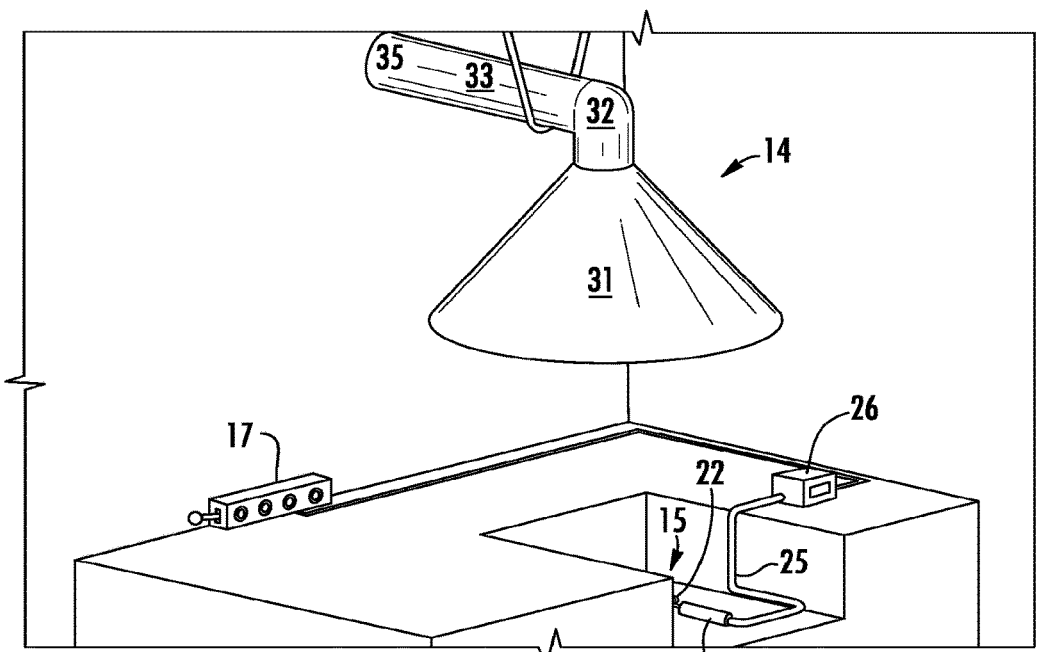
FIGS. 2A through 2C illustrate an exemplary set of the system shown in FIG. 1 within and around a dwelling.
Figure 2A:
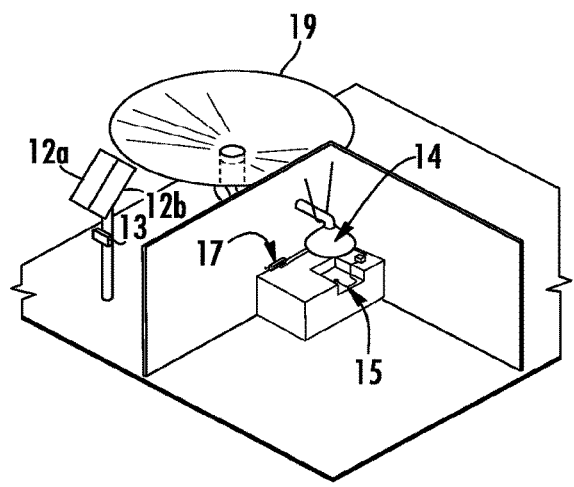
Figure 2B:
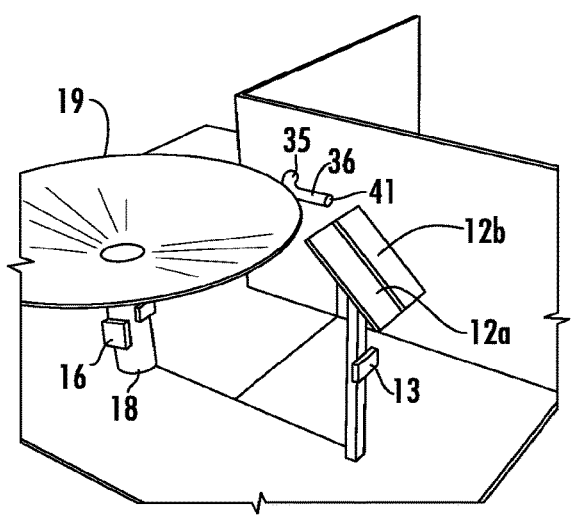

In addition, the flexible conduit 35 may be sufficiently long or combined with more than one section of flexible conduit to reach from the fan conduit 33 to the outside wall of the dwelling. For example, in one implementation, sections of conduit that are about 15 feet long are used for the flexible conduit 35. Lastly, the wall penetration conduit portion 36 may further include a rain hood, such as a beveled end portion 41, to prevent rain from running into the dwelling through the device 14. The mounting hardware 37 may include straps, wire, and eye hooks, such as shown in FIGS. 2A and 2C.

Figure 4:
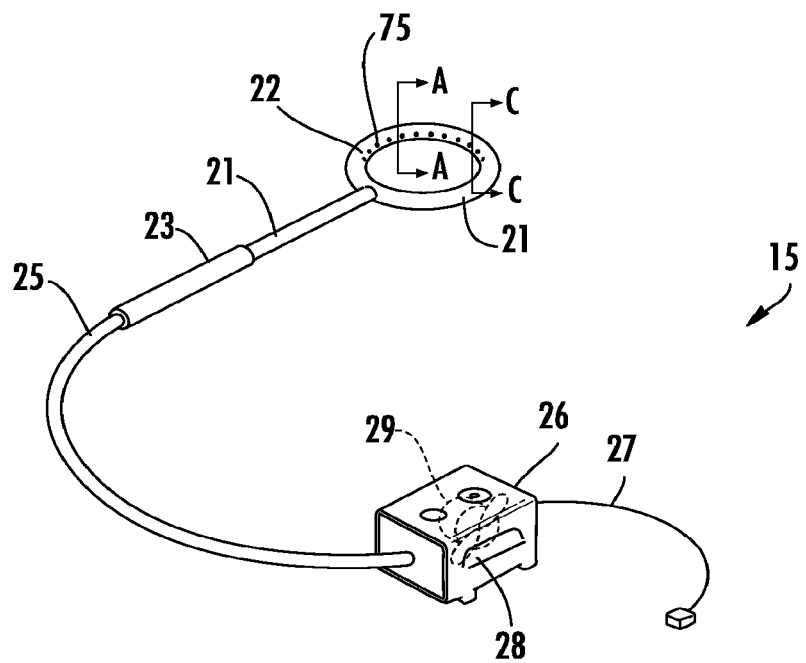
FIG. 4 illustrates a perspective view of the fan assisted cooking device shown in FIG. 1.

FIG. 4 illustrates a variable speed, fan-assisted cooking device 15 for improving combustion of solid fuel and convection of the heat resulting from the combustion according to one implementation. In various implementations, the device 15 is configured for being selectively inserted and removed from adjacent the area in which the solid fuel is to be or is being combusted, and it is not necessary to attach the device 15 to (or adjacent to) the combustion area. This flexibility allows the device 15 to be used in various types of combustion areas. For example, the device 15 may be used on existing surfaces and stoves for which solid fuel is combusted for cooking or providing thermal energy.

The implementation of the device 15 shown in FIG. 4 includes a housing 26 in which a fan or impeller 29 with a variable speed controller is disposed, a power cord 27 for supplying power to the controller, a flexible conduit 25, an insulated handle 23 defining a conduit through which air may flow, a heat-resistant conduit 21, and a perforated conduit 22 made of a heat-resistant material. The housing 26 includes the variable speed controller (not shown separately), the fan 29, and an inlet 28 for receiving air into the housing 26. A proximal end of the flexible conduit 25 is attached to the housing 26, and a distal end of the flexible conduit 25 is attached to a proximal end of the insulated handle 23. A distal end of the insulated handle 23 is attached to a proximal end of the heat-resistant conduit 21, and a distal end of the heat-resistant conduit 21 is attached to an inlet of the perforated conduit 22.

Figure 8A:
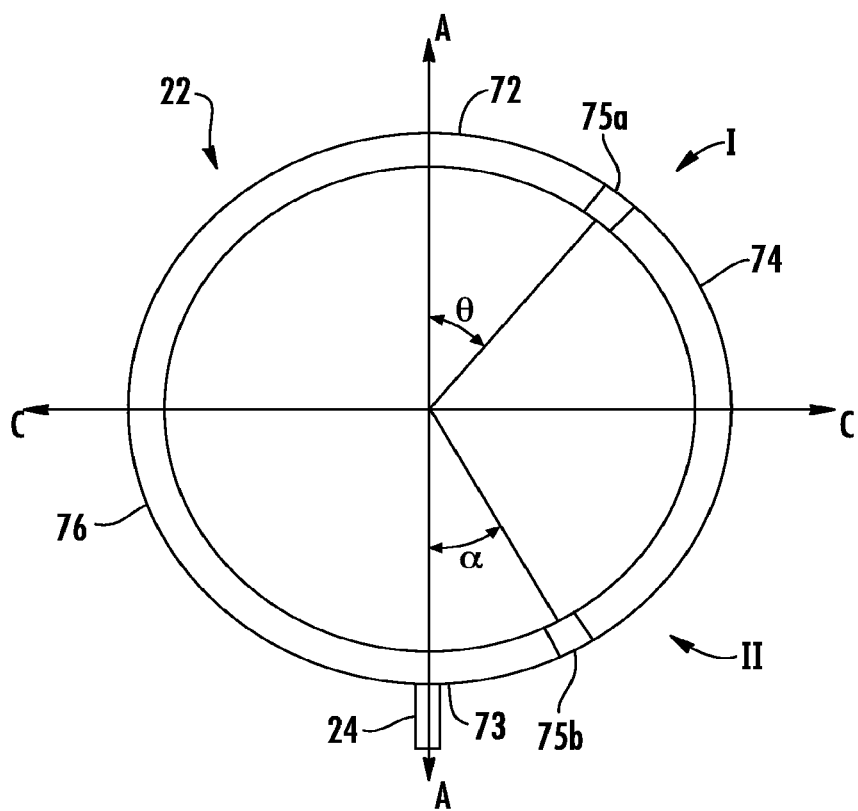
FIG. 8A illustrates a cross-sectional view of the conduit in FIG. 4 as taken along the A-A line.
Figure 8B:
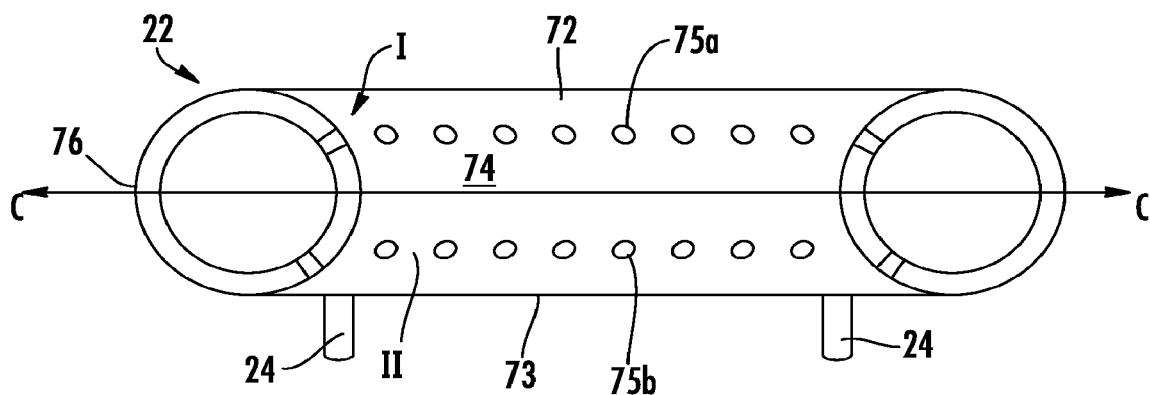
FIG. 8B illustrates a partial cross-sectional view of the conduit in FIG. 4 as taken along the C-C line.

The perforated conduit 22 shown in FIG. 4 is ring, or annular, shaped and defines a plurality of holes 75 through which air flows out of the conduit 22. The holes 75 may be defined on an upper surface 72, a lower surface 73, and/or inner 74 or outer radial side surfaces 76 of the conduit 22. For example, in the implementation shown in FIGS. 4, 8A, and 8B, the inner radial side surface 74 is shown as having an upper quadrant I and a lower quadrant II. The upper quadrant I is defined as the portion of the inner radial side surface 74 that extends between the intersection of the A-A line with the upper surface 72 and the intersection of the inner radial side surface 74 with plane C-C, which bisects the conduit 22 between the upper 72 and lower surfaces 73 through the inner 74 and outer radial side surfaces 76. The lower quadrant II is defined as the portion of the inner radial side surface 74 that extends between the intersection of the A-A line and the lower surface 73 and the intersection of the inner radial side surface 74 and plane C-C. In the implementation shown in FIGS. 8A and 8B, holes 75*a* are defined through the upper quadrant I, and holes 75*b* are defined through the lower quadrant II. The holes 75*a* defined in the upper quadrant I may be disposed at an angle $\ominus$ of about 0° to about 90° between the A-A line and the C-C plane, such as, for example, between about 30° to about 60°. And, holes 75*b* defined in the lower quadrant II may be disposed at an angle α of about 0° to about 90° relative to the A-A line and the C-C plane, such as, for example, between about 30° to about 60°. In the exemplary implementation shown in FIG. 8A, the angle $\ominus$ of the holes 75*a* in the upper quadrant I are around 40° from A-A line as measured from the point of intersection with the upper surface 72, and the angle α of the holes 75*b* in the lower quadrant II are around 30° from the A-A line as measured from the point of intersection with the lower surface 73. In other implementations, the angles $\ominus$ and α may be substantially the same as measured from their respective points of intersection. And, in yet another implementation, there may be one set of holes disposed along the intersection of the plane C-C with the inner radial side surface 74, which is about 90° from the A-A line as measured from the point of intersection with the upper 72 or lower surface 73. Furthermore, the interior surface of the holes 75 may be smooth or threaded.

Having holes directed generally toward the solid fuel being combusted facilitates the flow of air toward the solid fuel to improve combustion and assists with directing the flow of heat resulting from the combustion toward the cooking area above it. In addition, the flow of air from the conduit 22 assists with the flow of combustion gases and air-borne particulate toward the hood 31. The perforated conduit 22 may also include legs 24 that extend downwardly from a lower surface of the conduit 22 to raise the conduit 22 off of a bottom surface of a cooking area, which allows for more air flow around the conduit 22 and the solid fuel being combusted in the cooking area. Thus, air is forced by the fan 29 through the flexible conduit 25, insulated handle 23, heat-resistant conduit 21, and perforated conduit 22 and out through the holes defined in perforated conduit 22 to assist with combustion of the solid fuel and convection of the heat resulting from the combustion.

To allow the perforated conduit 22 to be disposed close to or surrounded by the solid fuels being combusted, the perforated conduit 22 and heat-resistant conduit 21 may be made of stainless steel, ceramic, or other suitable heat-resistant material. Thus, the perforated conduit 22 may be disposed in direct contact at least a portion of the solid fuel being combusted to provide air at the point of combustion for the solid fuel mass that is in direct contact with the conduit 22. The conduit 22 also provides air close to the point of combustion for the surrounding solid fuel mass. The conduit 21 may be about ¼-1 inches in diameter, for example. The perforated conduit 22 may be ring shaped with the inlet end extending from one side of the ring, and the ring may have a diameter of around 4-8 inches.

Figure 9:
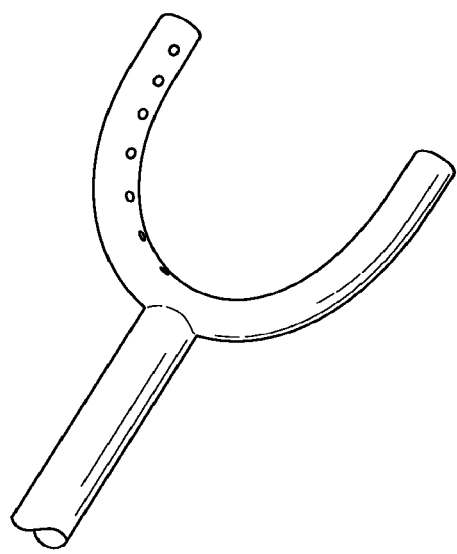
FIG. 9 illustrates a perspective view of a U or C-shaped housing according to one implementation.
Figure 10:
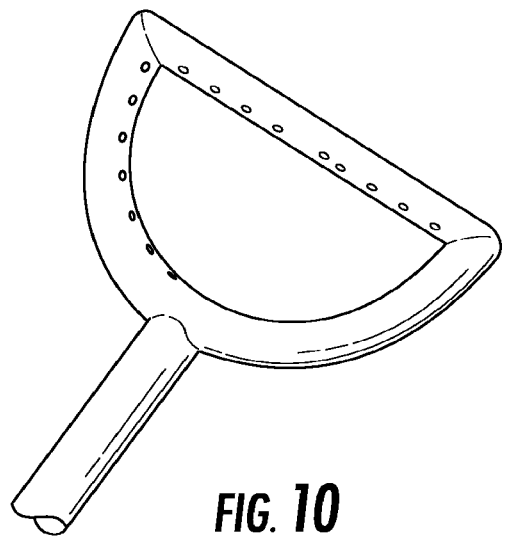
FIG. 10 illustrates a perspective view of a D-shaped housing according to one implementation.

Although FIG. 4 illustrates a ring-shaped perforated conduit 22, the perforated conduit may have other suitable shapes, such as a C or U-shape as shown in FIG. 9, a D-shape as shown in FIG. 10, or a square shape (not shown). In each of these implementations, the holes are directed toward a central combustion zone adjacent the inner radial side surface 74 of the perforated conduit 22, and the perforated conduit is in fluid communication with the distal end of the heat-resistant conduit 21.

The flexible conduit 25 may be formed of galvanized steel, for example, or other suitable material for guiding air from the housing 26 toward the perforated conduit 22. In addition, the flexible conduit 25 may be around ¾-1 inches in diameter, for example. The conduit 25 may also be around 36 inches long. The insulated handle may be made of a heat-resistant material and include a non-conductive coating around an outer diameter thereof to allow a user to move the conduits 21, 22 around the solid fuel burning area without burning the user. The power cord 27 may be a 12 VDC electrical plug, and the housing 26 may also include a light indicating that power is being supplied to the housing 26. In addition, the legs 24, which are made of a heat-resistant material, may be about ¼-½ inches in diameter and about 1-2 inches long.

The cooking device 15 provides combustion efficiency gains of about 25 to about 50% and decreases emissions by about 25% to 50%, according to certain implementations. However, the gains and decreases in emissions may be higher or lower depending on the components used and the solid fuel used. This improvement in combustion efficiency reduces the amount of fuel needed for cooking, which reduces the amount of time members of the household have to spend collecting the solid fuel. Furthermore, the cooking device 15 does not require any major modification to traditional stove design or cooking methods that may used in various parts of the world, making it more attractive to the people in those areas. In addition, by decreasing emissions by assisting with combustion using the cooking device 15 and facilitating the movement out of the cooking area and dwelling of combustion by-product gases and particulates using the exhaust hood device 15, the people using the system 10 immediately notice and appreciate better air quality and improved cooking.

Figure 6:
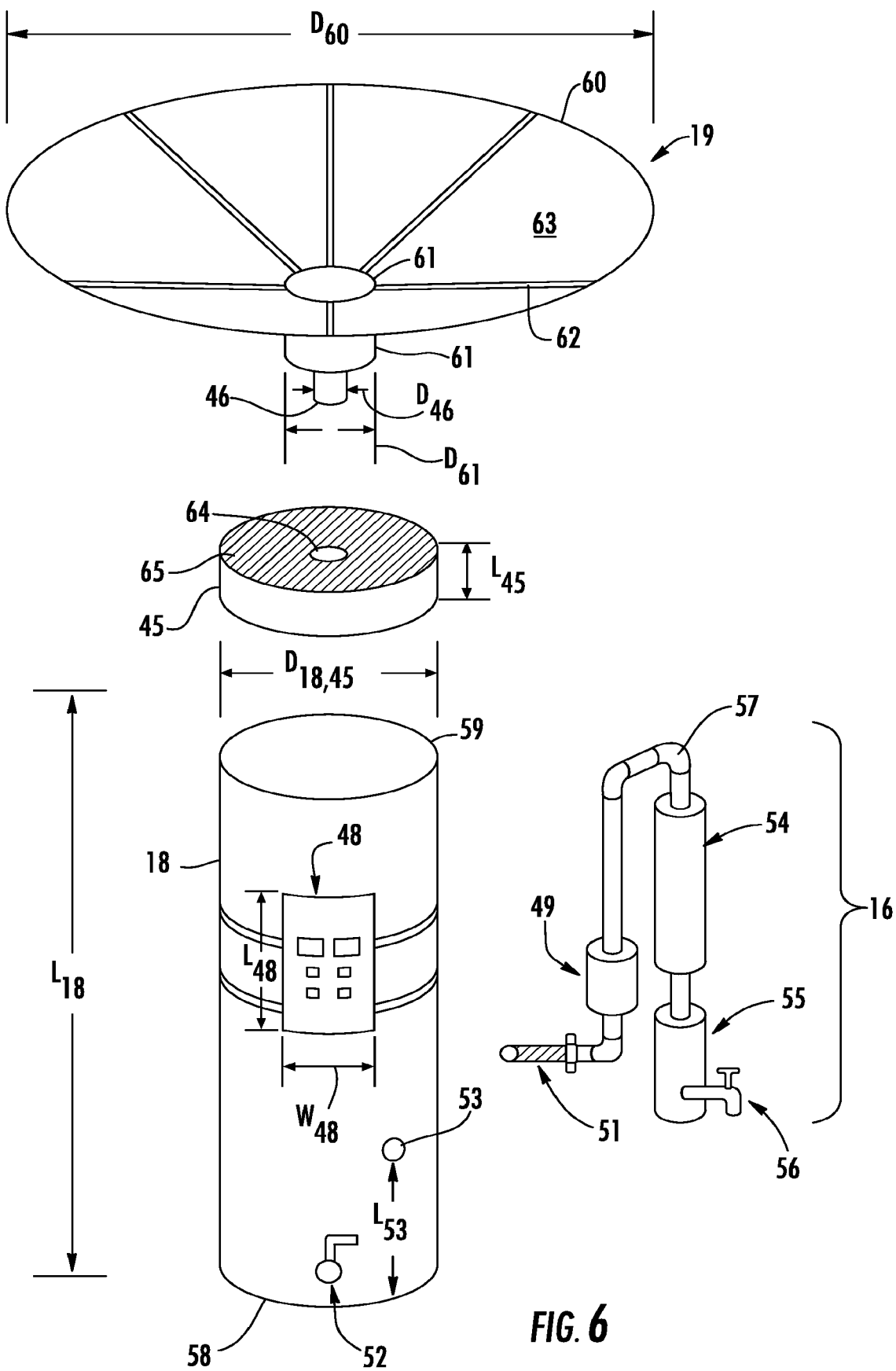
FIG. 6 illustrates a schematic of the water tank, water capturing, and water filtration system according to one implementation.

FIG. 6 illustrates a schematic of the water tank 18, water capturing funnel 19, and water purification device 16 according to one implementation. The water tank 18 may be a generally cylindrical hollow body configured for holding about 100 to about 125 gallons of water. The tank 18 may have a length $L_{18}$ of about 85 inches and a diameter $D_{18}$ of about 12 inches. A controller housing 48 may be secured adjacent a wall of the tank 18. In addition, the tank 18 defines an outlet opening 53 spaced above a bottom surface 58 of the tank 18. The outlet opening 53 may be about 1 inch in diameter and may be spaced about 12 inches above the bottom surface 58 of the tank 18. The tank 18 also include a flush outlet and valve 52 disposed adjacent the bottom surface 58 of the tank 18 for allowing the tank to be selectively drained and flushed out through the flush outlet and valve 52 periodically. The flush outlet and valve 52 may have a diameter of about 1 inch. An upper wall 59 of the water tank 18 defines an opening through which water may enter the tank. For example, as shown in FIG. 6, the upper wall 59 terminates at the opening. In other implementations (not shown), an annular shaped surface may extend radially inwardly from the upper edge of the vertical wall and define an opening through which water may flow into the tank 18.

The water capturing funnel 19 may be generally frusto-conical shaped and have an inlet end 60 and an outlet end 61. The inlet end 60, which faces upwardly to capture rainwater and other water being manually poured into the funnel 19, has a diameter $D_{60}$ of about 13 to about 16 feet (e.g., about 14.75 feet), and the outlet end 61 has a diameter $D_{61}$ of about 12 inches. The funnel 19 may be formed of a collapsible and expandable material, such as corrugated plastic, metal, coated fabric, or a combination thereof. In the implementation shown in FIG. 6, the funnel 19 may include rigid support posts 62 that extend radially outwardly from the outlet end 61 and a coated fabric material 63 that is attached to and extends over the support posts 62. For example, in one implementation, the fabric may be a rip-stop nylon material with a UV inhibitor coating.

Figure 7:
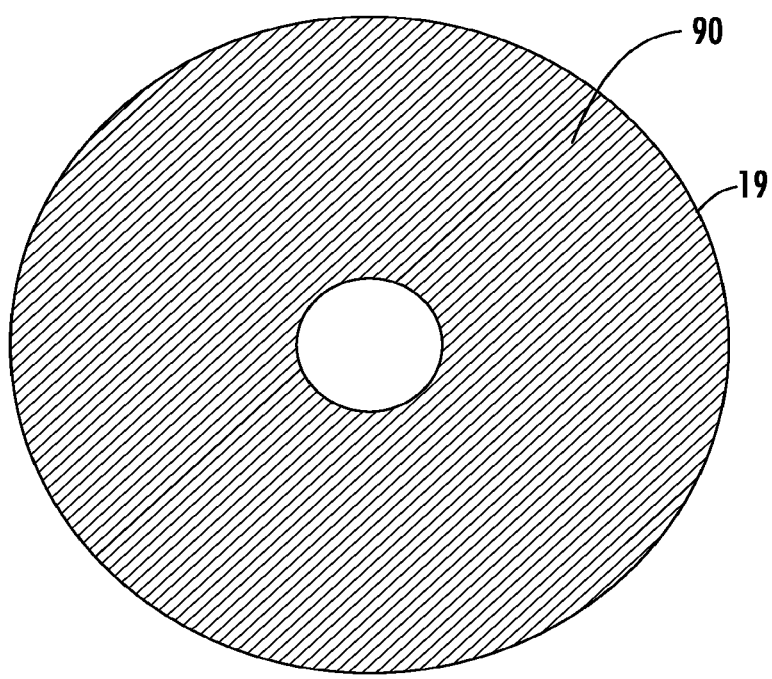
FIG. 7 illustrates a flexible photovoltaic material disposed on an inner surface of a collapsible and expandable funnel according to one implementation.

As shown in FIG. 7, a flexible photovoltaic material 90 may be disposed on at least a portion of surface of the collapsible funnel 19, such as an inner (or concave) surface 63. This flexible photovoltaic material 90 may be provided instead of or in addition to the solar panels 12a, 12b shown in FIG. 1. The flexible photovoltaic material 90 may be any suitable type of photovoltaic fabric, panel, film, or paint that is sufficiently thin and flexible to be disposed on the funnel 19 and withstand collapsing the funnel 19 during packaging and expanding the funnel 19 during installation. For example, the flexible solar films disclosed on the following website may be suitable:

http://www.powerfilmsolar.com/about/technology/
http://www.ifaipublications.com/iaa/articles/2914_solar-.html In addition, the solar paints, such as those disclosed on the following websites, may be suitable:

http://cleantechnica.com/2013/05/15/caution-wet-solar-power-new-affordable-solar-paint-research/
http://oilprice.com/Latest-Energy-News/World-News/Solar-PaintThe-Next-Big-Thing.html
http://www.cnet.com/news/new-nanotech-quantum-dots-to-make-solar-cells-lighter-cheaper/

The flexible solar material 90 may provide about 400 to about 1600 watts of power, for example. Furthermore, by lining the interior, or incident, surface 63 of the funnel 19 with flexible solar material 90, at least some portion of the material 90 is likely to be facing the sun for much of the day. For example, a collection rate of about 40% or greater may be possible for the material 90 depending on the season and latitude of the location of the funnel 19.

A screen 45 is disposed between the inlet end 59 of the water tank 18 and the outlet end 61 of the funnel 19 to prevent debris from entering the water tank 18. The screen 45 may be a disc-shaped screen having a length $L_{45}$ of about 4 inches, and a diameter $D_{45}$ of about 21 inches, and it may be made of stainless steel, galvanized expanded metal, or other suitable material. The screen 45 may also define an opening 64 on an inlet side 65 thereof that is configured for receiving a post 46 that extends from a lower surface adjacent the outlet end 61 of the funnel 19. The post 46 may be about 2 inches in diameter. The engagement of the post 46 within the opening 64 secures the funnel 19 to the upper opening 59 of the tank 18. However, it should be understood that this arrangement is exemplary and other suitable engagement mechanisms may be used.

The water purification device 16 includes a screened inlet opening 51 that connects to the outlet 53 of the tank 18, a pump 49 disposed upstream of the inlet opening 51 configured for pressurizing water flowing from the tank 18 through the water purification device 16, a mechanical filtration device 54, a conduit 57 extending between the pump and a mechanical filtration device 54, an ultra-violet light purification device 55, and an outlet valve/spigot 56. The screened inlet opening 51 may be made from perforated PVC piping, for example. The pump 49 is electrically powered by the battery 13. The pump may be a brushless, DC powered pump, such as the Zhonglong pump shown at http://zhonglongpump.en.made-in-china.com/product/RbdmgHu-VgnDX/China-Brushless-DC-Warm-Water-Pump.html The conduit 57 extending between the pump 49 and the mechanical filtration device 57 may include typical PVC water piping, such as schedule 40. The mechanical filtration device 54 may include rocks, sand, charcoal, and/or other filter medium for filtering out certain particulates and organisms from the water flowing therethrough. And, the ultra-violet (UV) light purification device 55 uses electrical power from the battery 13 to irradiate water flowing therethrough with UV light to kill other organisms (e.g., viruses or harmful bacteria) that may not be captured in the mechanical filtration device 54. The UV device 55 may include relatively low power consuming light emitting diodes and/or compact fluorescent bulbs (e.g., 3-15 watt diodes or bulbs) so that UV purification can be provided on a small scale using the solar energy captured by the panels 12a, 12b and stored in battery 13.

Treating water on a micro (e.g., household) scale has been difficult traditionally due to very small viruses found in many water sources around the world. Although mechanical filtration (e.g., sand, rocks, carbon, filter mediums, etc.) can adequately sanitize some water sources, organisms and viruses below about 1 to about 2 micrometers in size tend to pass through. For this reason, additional sanitation techniques (e.g., chemical treatment, heat, etc.) may be used with the mechanical filtration to provide a device that is suitable for sanitizing any water source globally. Chemical treatments are costly, can be dangerous if the added amounts are not carefully monitored, and may not be feasible in remote regions in which supply chains do not exist. Likewise, heat treatments (e.g., boiling) require time and energy that may not be feasible to provide to remote regions or to numerous households. Thus, UV light sterilization powered by solar power provides a safe, effective, and easily distributable method of sanitizing water.

Figure 3:
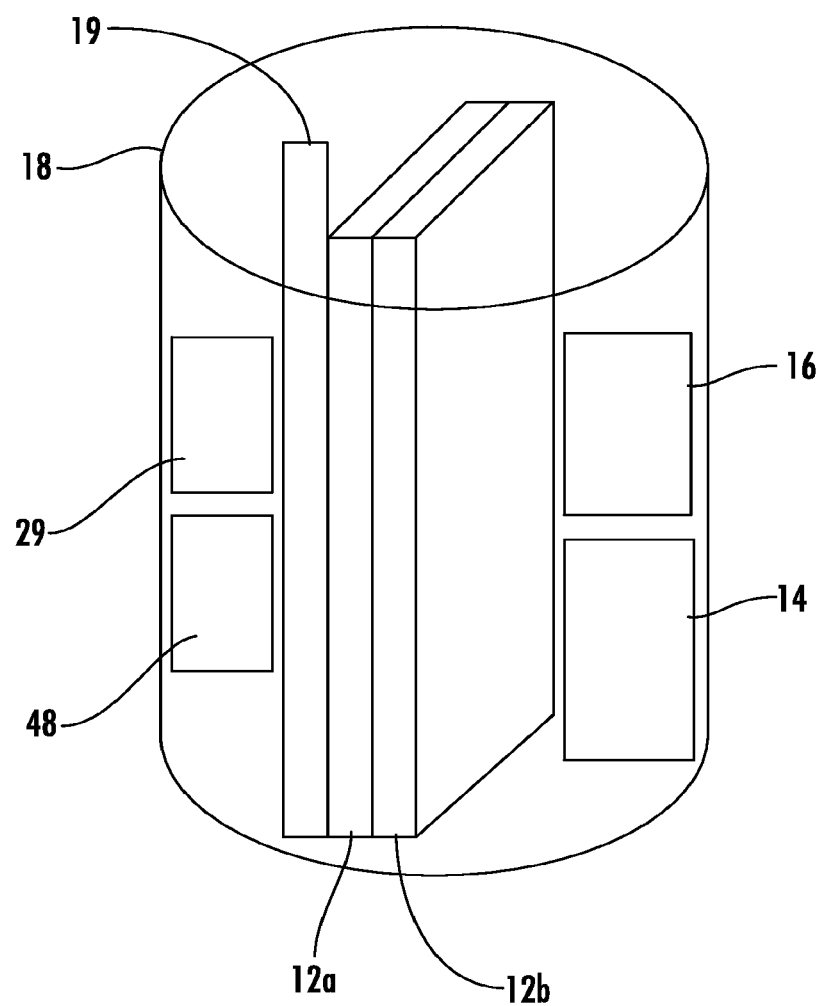
FIG. 3 illustrates a schematic of packaging for the system shown in FIG. 1.

As shown in FIG. 3 and described above, several of the components described above are collapsible such that they may be disposed, or nested, within the interior of the water tank 18 for shipping to various households or communities. Other components that are not easily collapsible may be sized such that they fit within the water tank 18 for ease of shipping and a reduction of packaging. The battery 13 may be provided separately onsite, such as with car batteries or other batteries that may be repurposed for use with the system 10.

Thus, the system 10 provides a combined solution to various issues facing households in areas that do not have reliable access to safe cooking fuels, adequate ventilation, safe water supply, or electricity. This combined solution approach allows the system 10 to be commercially viable from a return on investment perspective. In particular, by providing multiple benefits in one system, the costs associated with solving each individual problem are reduced. In addition, this system may be integrated more easily in existing households, making it a more viable solution. This system may also be helpful in disaster recovery or refugee situations in which large populations of displaced people face disruption of basic services and similar health threats.

The dimensions listed in relation to the above described figures are exemplary only and should not be used to limit the scope of the invention unless otherwise specified. In addition, the Appendix filed with the specification and drawings of U.S. Provisional Application No. 62/004,694, the entirety of which is incorporated by reference above, includes a description of an exemplary implementation of the system, which is referred to as "Tree of Life 1.0." However, this implementation should not be used to limit the scope of the claims as it is only one example of how the system may be implemented.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," "attached," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being separately formed and attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system for providing micro-renewable energy comprising:
   at least one solar panel configured for collecting solar energy;
   a fan-assisted exhaust hood device configured for capturing at least a portion of gases and air-borne particulates from combustion of solid fuel, the hood device comprising a first fan and a hood that is configured for being in fluid communication with the first fan and for being moved between a collapsed position and an expanded position;
   a fan-assisted cooking device configured for supplying air to a solid fuel cooking fire to improve combustion of the solid fuel, the cooking device comprising a second fan and a perforated housing configured for being disposed in direct contact with at least a portion of the solid fuel being combusted;

a water purification device; and a water tank, wherein the solar panel, the fan-assisted exhaust hood device, the fan-assisted cooking device, and the water purification device are configured for being disassembled and disposed within the water tank for transportation of the system, wherein the fan-assisted exhaust hood comprises a frusto-conically shaped hood and a conduit in fluid communication with the hood, and the first fan is disposed within the conduit, and wherein the hood is collapsible.

2. The system of claim 1, wherein the water purification device comprises an ultra-violet (UV) light source.

3. The system of claim 2, wherein the UV light source comprises light emitting diodes (LEDs) and/or compact fluorescent light (CFL) bulbs.

4. The system of claim 1, wherein a speed of rotation of the second fan is controlled by a variable speed controller, the variable speed controller configured for adjusting the speed of rotation of the second fan.

5. The system of claim 1, wherein the shape of the perforated housing is selected from the group comprising: annular shaped, C-shaped, U-shaped, and D-shaped.

6. A system for providing micro-renewable energy comprising:

at least one solar panel configured for collecting solar energy;

a fan-assisted exhaust hood device configured for capturing at least a portion of gases and air-borne particulates from combustion of solid fuel, the hood device comprising a first fan and a hood that is configured for being in fluid communication with the first fan and for being moved between a collapsed position and an expanded position;

a fan-assisted cooking device configured for supplying air to a solid fuel cooking fire to improve combustion of the solid fuel, the cooking device comprising a second fan and a perforated housing configured for being disposed in direct contact with at least a portion of the solid fuel being combusted;

a water purification device; and a water tank, wherein the solar panel, the fan-assisted exhaust hood device, the fan-assisted cooking device, and the water purification device are configured for being disassembled and disposed within the water tank for transportation of the system, wherein the perforated housing defines a plurality of holes and the second fan is configured for forcing air through the plurality of holes toward the solid fuel cooking fire, wherein at least a first portion of the plurality of holes defined by the perforated housing are arranged along an inner radial side surface of the perforated housing, wherein the first portion of the plurality of holes are defined within an upper quadrant of the inner radial side surface and a second portion of the plurality of holes are further defined within a lower quadrant of the inner radial side surface, the upper quadrant being defined on the inner radial side surface between an upper surface of the perforated housing and a plane bisecting the inner radial side surface and an outer radial side surface, and the lower quadrant being defined on the inner radial side surface between the bisecting plane and a lower surface of the perforated housing.

7. The system of claim 6, wherein the first portion of the plurality of holes are arranged at a first angle of between about 30° to about 60° above the intersection of the bisecting plane with the inner radial side surface, and the second portion of the plurality of holes are arranged at a second angle of between about 30° to about 60° below the intersection of the bisecting plane with the inner radial side surface.

8. The system of claim 1, wherein the perforated housing comprises one or more legs that extend downwardly from a lower surface of the perforated housing.

9. The system of claim 1, wherein the water tank defines an outlet on a side wall thereof, the outlet being in fluid communication with the water purification device.

10. A system for providing micro-renewable energy comprising:

at least one solar panel configured for collecting solar energy;

a fan-assisted exhaust hood device configured for capturing at least a portion of gases and air-borne particulates from combustion of solid fuel, the hood device comprising a first fan and a hood that is configured for being in fluid communication with the first fan and for being moved between a collapsed position and an expanded position;

a fan-assisted cooking device configured for supplying air to a solid fuel cooking fire to improve combustion of the solid fuel, the cooking device comprising a second fan and a perforated housing configured for being disposed in direct contact with at least a portion of the solid fuel being combusted;

a water purification device; and a water tank, wherein the solar panel, the fan-assisted exhaust hood device, the fan-assisted cooking device, and the water purification device are configured for being disassembled and disposed within the water tank for transportation of the system, wherein the water tank comprises a bottom surface and a cylindrically shaped side wall extending upwardly from the bottom surface, and the water tank defines an opening adjacent an upper edge of the side wall, the system further comprising a frusto-conically shaped funnel configured to be disposed adjacent the opening and for capturing rain water and funneling the captured rain water into the opening.

11. The system of Claim 10, wherein the funnel is collapsible.

12. The system of claim 10, wherein the at least one solar panel is disposed on at least a portion of a surface of the funnel.

13. The system of claim 10, wherein the upper edge of the side wall defines the opening.

14. The system of claim 10, wherein an annular shaped surface extends radially inwardly from the upper edge of the side wall and defines the opening.

15. The system of claim 1, further comprising a battery and an outlet plug in electrical communication with the battery, the outlet plug configured for providing electrical energy from the battery to one or more battery operated devices or light-emitting diode (LED) lights.

\* \* \* \* \*